Patented June 8, 1954

2,680,742

UNITED STATES PATENT OFFICE 2,680,742

PRODUCTION OF 3- AND 4-CYANO-PYRIDINES

John V. Scudi, Bronx, and Anthony F. Moschetto, Yonkers, N. Y., and George Mayurnik, Garfield, N. J., assignors to Nepera Chemical Co. Inc., Yonkers, N. Y., a corporation of New York No Drawing. Application September 25, 1951, Serial No. 248,268

5 Claims. (Cl. 260—294.9)

This invention relates to the production of cyanopyridines and particularly to the production of 3- and 4-cyanopyridines from pyridine carboxylic acids having a carboxyl group in the β or γ position, or in other words, having a carboxyl group attached to a carbon atom non-adjacent to the nitrogen atom.

Of the above two cyanopyridines, 3-cyanopyridine is the more important one and is produced at present commercially from 3-pyridine sulfonic acid. The cyanopyridines, or nitriles, are used for the direct production of the corresponding amides. They are, however, also important as intermediates for other syntheses.

We have found that we can produce in a convenient way, 3- or 4-cyanopyridines, or mixture thereof, in the vapor phase by vaporizing the corresponding pyridine carboxylic acids in a stream of ammonia and passing the mixture over a dehydrating catalyst, such as alumina, silica gel, etc. 2-pyridine carboxylic acid does not form 2-cyanopyridine when so treated. It will be decarboxylated and pyridine is the resulting product. 2-,3-, and 2-,5-pyridine dicarboxylic acids also decarboxylate in the 2-position and result in 3-cyanopyridines.

The probable equation of the reaction is the following:

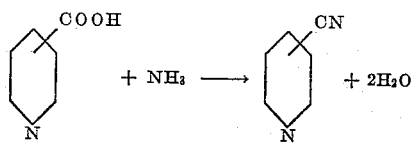

A convenient manner of carrying out our invention is to use a 1 inch, jacketed, stainless steel pipe or tube filled half way with glass beads or similar material, as the vaporizer. The jacket may be filled with a molten salt bath mixture or other heat transfer agent, heated electrically, or otherwise, to the desired temperature. The solid pyridine carboxylic acids are introduced by a valve arrangement on the top, at definite intervals. Anhydrous ammonia is passed into the vaporizer near the top, after being measured in a rotameter. The ammonia used should be at least equimolecular quantity, but the use of an excess appears to be desirable, preferably substantially 2 or 3 times the weight of the acid used. The gases from the vaporizer are conducted to the top of a reactor tube which may also be made from a 1 inch stainless steel pipe. The reactor tube is packed with the catalyst and its temperature is maintained in a similar manner as that of the vaporizer. The temperature of the vaporizer is kept at 200° C. to 400° C. and of the reactor is about 275° C. to 450° C. The exit gases from the reactor are passed through a condenser, where they are cooled, and the condensibles collected in an ice-water cooled receiver. After the reaction is stopped, the condenser is washed into the receiver with ethyl ether and the ether and water layers are separated. The ether layer, which contains the cyanopyridine in solution, may then be separated and dried with anhydrous sodium sulfate and then distilled to recover the cyanopyridine.

For catalyst in the reactor we have employed various dehydrating catalysts. Most of these are commercially available and may be used in form of pellets or deposited on porous material like pumice, clay chips and the like. Of the commercial dehydrating catalyst we use alumina, vanadium on alumina, vanadium on pumice, silica gel, activated carbon, but other dehydrating catalysts like thorium oxide, aluminum phosphate and others may be used also.

We prefer to carry out our invention at atmospheric pressure, but it may be carried out at superatmospheric pressure or partially reduced pressure. In the last mentioned case, the suction is applied on the receiving vessel.

Having so described our invention, the following are several illustrative examples of the preferred procedures of carrying out our invention, which are given for illustration and not for limitation.

*Example 1*

The reaction was carried out in the equipment described above. The reactor tube was filled with commercial alumina as catalyst and was maintained at 350° C. 35 grams of nicotinic acid (3-pyridine carboxylic acid) per hour was fed through the valve into the vaporizer in approximately equal quantities at fifteen minute intervals, while the vaporizer was maintained at 250° C. Also, 55 grams per hour of anhydrous ammonia gas preheated to about 325° C. was fed into the same vaporizer. The resulting vapors were passed into the hot reactor and the exit gases cooled in the condenser and the product collected in the ice-water cooled receiver. When the reaction was stopped, the condenser was washed with ethyl ether into the receiver. The aqueous layer was separated and the ether from the solution, after drying with anhydrous sodium sulfate and filtering, was distilled off. The residue was distilled in vacuum. The product was 3-cyanopyridine, as determined by its melting point and its mixed melting point with a known sample of this material. The yield obtained was 88% of the theoretical.

*Example 2*

The reaction was repeated as in Example 1, using commercial silica gel as catalyst in the reactor. 15 grams of nicotinic acid and 27 grams of anhydrous ammonia were passed into the reactor hourly. The temperature of both the vaporizer and reactor was maintained at 375° C. The product was worked up as in Example 1. The yield of 3-cyanopyridine was 68%.

*Example 3*

The reaction was repeated using activated carbon as catalyst. The same amount of nicotinic acid, and anhydrous ammonia were used as in Example 2. The temperatures on both tubes were maintained at 375° C. The yield of 3-cyanopyridine in this case was 21%.

*Example 4*

Using the same amount of material and temperatures as in Example 3 with vanadium on pumice as catalyst, the yield of 3-cyanopyridine obtained was 25%.

*Example 5*

In this example, 15 grams of quinolinic acid (2,3-pyridine dicarboxylic acid) was fed hourly into the reactor with 54 grams of anhydrous ammonia using commercial alumina as catalyst. The temperature was maintained at 375° C. in both vaporizer and reactor. The quinolinic acid decarboxylated in the 2-position and the product obtained was 3-cyanopyridine.

*Example 6*

In this example, 25 grams of isocinchomeronic acid (2,5-pyridine dicarboxylic acid) was fed hourly into the reactor with 55 grams of anhydrous ammonia using commercial alumina as catalyst. The temperature was maintained at 300° C. on the vaporizer and at 375° C. on the reactor. The isocinchomeronic acid decarboxylated in the 2-position and the product obtained was 3-cyanopyridine.

*Example 7*

The vaporizer was charged with 6.1 grams of isonicotinic acid (4-pyridine carboxylic acid) and 13 grams of anhydrous ammonia passed through while the temperature in the vaporizer was kept about 250–320° C. Commercial vanadium on alumina was used as catalyst in the reactor which was heated to 350° C. The experiment was worked up as in the previous examples and the product obtained was 4-cyanopyridine.

Having so described our invention, we do not limit ourselves to the specifically mentioned times, temperatures, quantities, chemicals or steps of procedure, as these are given simply to clearly describe our invention as set forth in our specification and claims, and they may be varied without going beyond the scope of our invention.

What we claim is:

1. The process of producing 3-, and 4-cyanopyridines comprising the steps of vaporizing pyridine carboxylic acids selected from the group consisting of a pyridine carboxylic acid having a carboxy group in beta-position and a pyridine carboxylic acid having a carboxy group in gamma-position, between the temperatures of 200° to 400° C., passing the vapors with an excess, substantially 2 to 3 times the weight of the acid used, of anhydrous ammonia through a bed of dehydrating catalyst selected from the members of a group consisting of alumina, silica gel, vanadium, activated carbon, vanadium on alumina and vanadium on pumice, said bed of catalyst being heated to a temperature of 275° to 450° C., collecting the cyanopyridine formed by condensation and purifying the product by distilling under reduced pressure.

2. The process of producing 3-cyanopyridine comprising the step of passing the vapors of quinolinic acid and anhydrous ammonia through a bed of a dehydration catalyst selected from the group consisting of alumina, silica gel, vanadium, activated carbon, vanadium on alumina and vanadium on pumice, at an elevated temperature of 275° to 450° C. and decarboxylating the 2-carboxy group in the process.

3. The process of producing 3-cyanopyridine comprising the step of passing the vapors of 2,5-pyridine dicarboxylic acid and anhydrous ammonia through a bed of a dehydration catalyst selected from the group consisting of alumina, silica gel, vanadium, activated carbon, vanadium on alumina and vanadium on pumice, at an elevated temperature of 275° to 450° C. and decarboxylating the 2-carboxy group in the process.

4. The process of producing 3-cyanopyridine comprising the step of passing the vapors of nicotinic acid and anhydrous ammonia through a bed of a dehydrating catalyst selected from the group consisting of alumina, silica gel, vanadium, activated carbon, vanadium on alumina and vanadium on pumice, at an elevated temperature of 275° to 450° C.

5. The process of producing 4-cyanopyridine comprising the step of passing the vapors of isonicotinic acid and anhydrous ammonia through a bed of a dehydrating catalyst selected from the group consisting of alumina, silica gel, vanadium, activated carbon, vanadium on alumina and vanadium on pumice, at an elevated temperature of 275° to 450° C.

References Cited in the file of this patent

UNITED STATES PATENTS

| Number | Name | Date |
| --- | --- | --- |
| 2,149,280 | Deem et al. | Mar. 7, 1939 |
| 2,200,734 | Arnold et al. | May 14, 1940 |
| 2,412,749 | Pike et al. | Dec. 17, 1946 |
| 2,427,400 | Garbo | Sept. 16, 1947 |
| 2,437,938 | Cislak et al. | Mar. 16, 1948 |
| 2,510,605 | Porter et al. | June 6, 1950 |